(12) United States Patent
Suigetsu

(10) Patent No.: US 8,181,328 B2
(45) Date of Patent: May 22, 2012

(54) FIXING METHOD FOR FIXING COMPONENTS TOGETHER

(75) Inventor: Naoki Suigetsu, Tokyo (JP)

(73) Assignee: Olympus Corporation, Tokyo (JP)

(*) Notice: Subject to any disclaimer, the term of this patent is extended or adjusted under 35 U.S.C. 154(b) by 252 days.

(21) Appl. No.: 12/725,888

(22) Filed: Mar. 17, 2010

(65) Prior Publication Data
US 2010/0242255 A1    Sep. 30, 2010

(30) Foreign Application Priority Data
Mar. 17, 2009    (JP) ................................ P2009-065086

(51) Int. Cl.
*B29C 65/00*    (2006.01)
(52) U.S. Cl. .................. 29/521; 29/525; 29/505; 29/428
(58) Field of Classification Search .................. 29/428, 29/458, 521, 238–239, 505, 525; 228/1.1, 228/110.1, 2.1–2.3, 112.1–114.5; 156/73.1, 156/73.5, 73.6, 242, 290, 293, 303.1, 308.4
See application file for complete search history.

(56) References Cited

U.S. PATENT DOCUMENTS

| | | | | |
|---|---|---|---|---|
| 3,499,808 A | * | 3/1970 | Obeda ............................ | 264/249 |
| 4,312,077 A | * | 1/1982 | Petersson ............................ | 2/265 |
| 4,859,378 A | * | 8/1989 | Wolcott ............................ | 264/445 |
| 4,865,680 A | * | 9/1989 | Pierson ............................ | 156/580.2 |
| 5,147,082 A | * | 9/1992 | Krause et al. .................. | 228/1.1 |
| 5,268,223 A | * | 12/1993 | Qureshi et al. ................. | 442/391 |
| 5,298,347 A | * | 3/1994 | Aksoy et al. ................... | 429/98 |
| 5,361,483 A | * | 11/1994 | Rainville et al. ............. | 29/524.1 |
| 5,642,852 A | * | 7/1997 | Suzuki et al. ............. | 228/110.1 |
| 6,066,216 A | * | 5/2000 | Ruppel, Jr. .................... | 156/73.1 |
| 6,313,533 B1 | * | 11/2001 | Funaya et al. ................. | 257/737 |

(Continued)

FOREIGN PATENT DOCUMENTS
JP    2005-246941    9/2005

*Primary Examiner* — Derris Banks
*Assistant Examiner* — Kaying Kue
(74) *Attorney, Agent, or Firm* — Scully, Scott, Murphy & Presser, P.C.

(57) ABSTRACT

There is provided a fixing method for fixing components together in which two components in the form of a first component and a second component are positioned such that they are mutually superimposed in predetermined relative positions, and are then fixed together, wherein the first component has at least two portions for engagement that are recessed in a contact surface thereof which is placed against the second component towards a surface thereof which is located on an opposite side from the contact surface, and the second component is formed from thermoplastic resin and has at least two protruding portions that protrude from positions that correspond to the portions for engagement of the first component on a surface of the second component which is located on the opposite side from a contact surface thereof which is placed against the first component, and wherein the fixing method for fixing components together includes: a first step in which the contact surfaces of both the first component and the second component are placed against each other, and the positions of the portions for engagement and the protruding portions are matched together; and a second step in which, by pressing a transmitting component that transmits ultrasonic waves against the protruding portions of the second component, the second component is softened by the ultrasonic waves and forms engaging portions that are protrude into the portions for engagement of the first component and become engaged with these portions for engagement.

2 Claims, 8 Drawing Sheets

U.S. PATENT DOCUMENTS

| | | | |
|---|---|---|---|
| 6,510,629 B1 * | 1/2003 | Smidt et al. | 40/1.5 |
| 6,926,187 B2 * | 8/2005 | Kurita et al. | 228/1.1 |
| 6,991,148 B2 * | 1/2006 | Kurita et al. | 228/110.1 |
| 7,776,214 B2 * | 8/2010 | Saito et al. | 210/231 |
| 7,815,409 B2 * | 10/2010 | Aeschlimann et al. | 411/451.1 |
| 8,016,964 B2 * | 9/2011 | Simon et al. | 156/64 |
| 8,048,246 B2 * | 11/2011 | Madueno et al. | 156/73.1 |
| 2003/0127725 A1 * | 7/2003 | Sugaya et al. | 257/700 |
| 2003/0196741 A1 * | 10/2003 | Burgess et al. | 156/92 |
| 2003/0234085 A1 * | 12/2003 | Kurita et al. | 156/580.2 |
| 2005/0028358 A1 * | 2/2005 | Kurita et al. | 29/829 |
| 2005/0162179 A1 * | 7/2005 | Hosaka et al. | 324/762 |
| 2005/0263237 A1 * | 12/2005 | Hatano | 156/73.1 |
| 2006/0151570 A1 * | 7/2006 | Shinkawa et al. | 228/1.1 |
| 2006/0175376 A1 * | 8/2006 | Adler | 228/1.1 |
| 2007/0158011 A1 * | 7/2007 | Tominaga et al. | 156/73.1 |
| 2008/0118823 A1 * | 5/2008 | Yang et al. | 429/100 |
| 2010/0237610 A1 * | 9/2010 | Suigetsu | 285/330 |

* cited by examiner

FIXING METHOD FOR FIXING COMPONENTS TOGETHER

BACKGROUND OF THE INVENTION

1. Field of the Invention

The present invention relates to a fixing method for fixing components together in which components are positioned so as to be superimposed on each other in predetermined relative positions and are then fixed together.

Priority is claimed on Japanese Patent Application No. 2009-65086, filed Mar. 17, 2009, the contents of which are incorporated herein by reference.

2. Description of Related Art

Conventionally, when components are fixed together by means of screws or rivets or the like, it is first necessary to place the components in predetermined relative positions and fix them together temporarily. One method for fixing together components of this type is to use a through hole in one of the components and the other component from a thermoplastic resin in which a projection is provided at a position that corresponds to the through hole in the one component. In this method, by precisely adjusting the position of the through hole in the one component relative to the surface on which the projection is formed on the other component, the projection on the other component is inserted into the through hole formed in the one component. Furthermore, by transmitting ultrasonic waves to the distal end of the inserted projection so as to crush this distal end, the positions are fixed (see, for example, Japanese Patent Application, Publication No. 2005-246941).

SUMMARY OF THE INVENTION

The present invention employs the following solutions. The fixing method for fixing components together of the present invention is a method in which two components in the form of a first component and a second component are positioned such that they are mutually superimposed in predetermined relative positions, and are then fixed together. The first component has at least two portions for engagement that are recessed in a contact surface thereof which is placed against the second component towards a surface thereof which is located on an opposite side from the contact surface. The second component is made of thermoplastic resin and has at least two protruding portions that protrude at positions that correspond to the portions for engagement of the first component on a surface of the second component which is located on the opposite side from a contact surface thereof which is placed against the first component. This fixing method for fixing components together includes a first step in which the contact surfaces of both the first component and the second component are placed against each other, and the positions of the portions for engagement and the protruding portions are matched together; and a second step in which, by pressing a transmitting component that transmits ultrasonic waves against the protruding portions of the second component, the second component is softened by the ultrasonic waves and forms engaging portions that are protrude into the portions for engagement of the first component and become engaged with these portions for engagement.

According to the fixing method for fixing components together of this invention, the contact surfaces of both a first component and a second component are placed against each other so that the positions of the portions for engagement and the protruding portions are matched together. Here, the protruding portions of the second component protrude from a surface thereof which is located on the opposite side from the contact surface thereof that is placed in contact with the first component, and neither the first component nor the second component have any portion which may provide an obstacle when the contact surface of the first component and second component are being placed in contact with each other. Because of this, irrespective of the relative positions of the through holes and protruding portions, it is possible to place the first component and the second component in a state of contact with each other without there being any possibility of the mutually contacting portions of each becoming damaged. In addition, in this state of mutual contact, the relative positions of the first component and second component can be adjusted by sliding them over their respective contact surfaces so that the positioning of the through holes and protruding portions can be performed easily and accurately. Furthermore, in the second step, a transmitting component that transmits ultrasonic waves is pressed against the protruding portions. The ultrasonic waves transmitted from the transmitting component are transmitted through the second component as far as the contact surface side thereof, and this results in frictional heat being generated in the second component. Here, the second component is formed from a thermoplastic resin. Because of this, the second component is heat-softened by the frictional heat. In addition, the portion pressed by the transmitting component sinks into the surface on the opposite side from the contact surface as a result of the protruding portion being pressed. In accordance with this, on the contact surface side, an engaging portion is fowled that protrudes into the portion for engagement of the first component. This engaging portion is then hardened by cooling and forms a state of engagement with the portion for engagement. As a result, the first component and the second component are reliably positioned by the portion for engagement and the engaging portion, and are placed in a fixed state.

In the above described fixing method for fixing components together, in the second step, at the same time as it transmits ultrasonic waves, it is preferable for the transmitting component to continue to press the protruding portions until it contacts the surface of the second component which is located on the opposite side from the contact surface thereof.

According to the fixing method for fixing components together of this invention, in the second step, as a result of the transmitting component pressing until it contacts the surface on the opposite side from the second component, there are no protruding portions protruding from the surface on the opposite side from the contact surface after the fixing is completed, and a more superior external appearance can be achieved.

DETAILED DESCRIPTION OF THE INVENTION

First Embodiment

Figure 1:
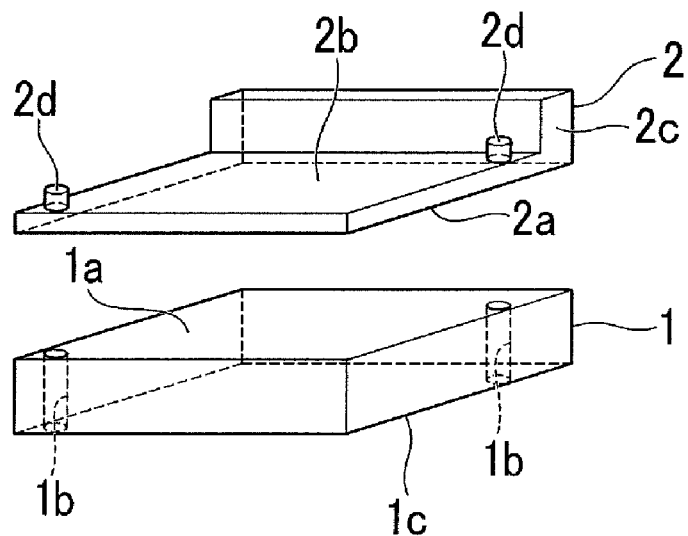
FIG. 1 is a perspective view showing a first component and a second component prior to fixing in a fixing method of a first embodiment of the present invention.

A first embodiment of the present invention will now be described with reference made to FIGS. 1 through 7. FIG. 1 shows a first component 1 and a second component 2 that are positioned and then fixed together using the fixing method of the present embodiment. The first component 1 is a substantially plate-shaped component in which a contact surface 1a that is placed against the second component 2 is formed as a substantially flat surface. Through holes 1b which serve as portions to be engaged penetrate from the contact surface 1a through to a surface 1c on the opposite side. In the present embodiment, the through holes 1b have a substantially circular cross section, and are formed in two locations in the first component 1. The second component 2 is a substantially plate-shaped component in which a contact surface 2a that is placed against the first component 1 is formed as a substantially flat surface. Furthermore, a rib 2c is provided on a surface 2b on the opposite side from the contact surface 2a of this second component, and protruding portions 2d protrude from two locations of the surface 2b. These protruding portions 2d are formed in a substantially circular column shape. The protruding portions 2d are provided at positions where they are coaxial with the through holes 1b of the first component 1. The protruding portions 2d have substantially the same outer diameter as the inner diameter of the through holes 1b. The height to which the protruding portions 2d protrude is set so as to be substantially equal to the protrusion amount (i.e., the volume of the amount of protrusion of the engaging portions 2e) of engaging portions 2e described below.

A specific example of the respective dimensions of the first component 1 and second component 2 is given below. For example, the height of the first component 1 is set to 10 mm, while the inner diameter of the through holes 1b is set to 3.05 mm. On the other hand, the thickness of the second component 2 is 0.4 mm, while the diameter of the protruding portions 2d is 3 mm, and the height thereof is 0.6 mm.

Note that, as is described below, in order for the second component 2 to undergo heat-softening by ultrasonic waves so as to form the engaging portions 2e, the second component 2 is made of a thermoplastic resin such as ABS resin (an acrylonitrile-butadiene-styrene copolymer), polyethylene or the like. In contrast, a variety of materials can be chosen for the first component 1 such as metals, resins, ceramics, or the like. However, as is described below, because the first component 1 is made to bond together with the second component 2 by heat-softening the second component 2, it is desirable that a material which has a higher melting point and a higher hardness than the thermoplastic resin being used to form the second component 2 is used for the first component 1. For example, in the present embodiment, the first component 1 is made of stainless steel SUS 303, and the second component 2 is made of ABS resin.

Next, the fixing method used to fix the first component 1 and the second component 2 together will be described in detail.

Figure 2:
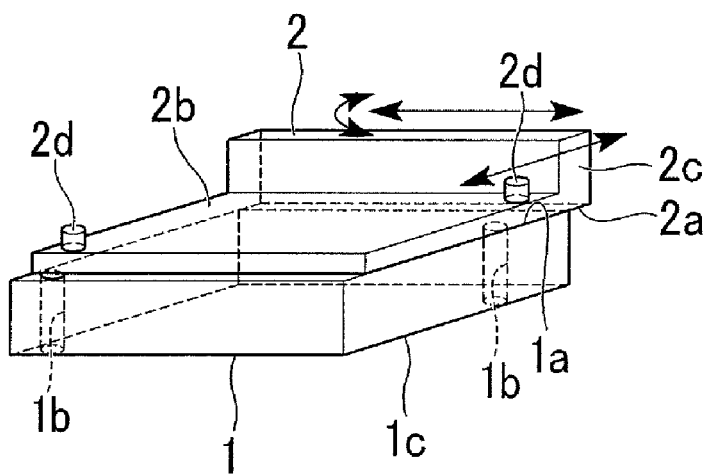
FIG. 2 is an explanatory view illustrating a first step in the fixing method of the first embodiment of the present invention.

As is shown in FIG. 2, in a preliminary step, the first component 1 is fixed onto a fixing base (not shown), and the second component 2 is set in a jig (not shown).

In a first step, the contact surface 2a of the second component 2 which has been set in the jig (not shown) is placed against the contact surface 1a of the first component 1 by a position control unit (not shown) to which the jig is connected. Here, the through holes 1b are simply open in the contact surface 1a of the first component 1 and any protruding portions are not provided therein. In the same way, no protruding portions are provided on the contact surface 2a of the second component 2. Because of this, when the contact surfaces 1a and 2a are placed in contact with each other so that the first component 1 and the second component 2 are mutually superimposed, it is possible to eliminate any possibility of the first component 1 and second component 2 being damaged.

The position control unit (not shown) then moves the jig so as to cause the second component 2 to slide over the contact surface 1a of the first component 1. As a result, the first component 1 and the second component 2 are positioned such that the through holes 1b in the first component 1 and the protruding portions 2d on the second component 2 are positioned on the same axes which are perpendicular to the contact surfaces 1a and 2a. This positioning is performed while the relative positions of the first component 1 and the second component 2 are verified by a position sensor which is built into the position control unit (not shown) with both side surfaces of the first component 1 and second component 2 and also marks which have been formed in advance being used as references. Moreover, because this positioning is performed with the first component 1 and the second component 2 placed in contact with each other, the second component 2 can be moved in a stable state over the contact surface 1a of the first component 1, so that positioning can be performed easily and accurately.

Figure 3:
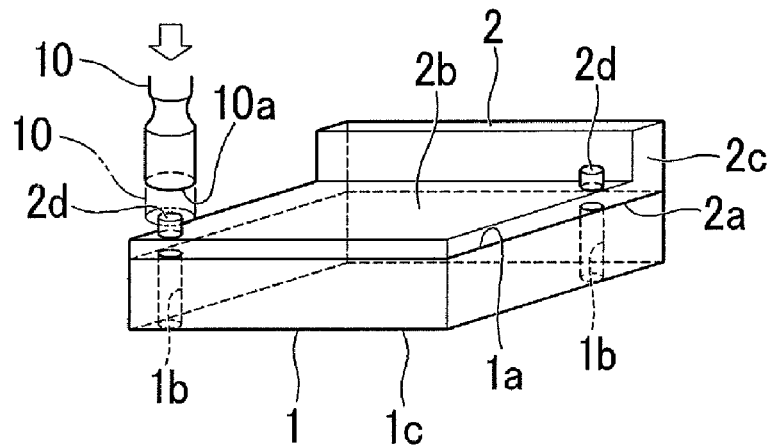
FIG. 3 is an explanatory view illustrating a second step in the fixing method of the first embodiment of the present invention.
Figure 4:
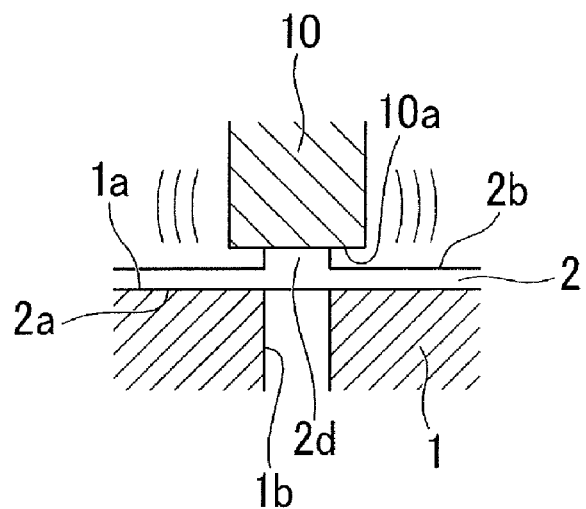
FIG. 4 is an explanatory view illustrating the second step in the fixing method of the first embodiment of the present invention.

In a second step, the first component 1 and the second component 2 which have completed the positioning process of the first step are fixed in position. Namely, as shown in FIG. 3, an ultrasonic horn 10 which serves as a transmission component is placed in contact with either one of the two protruding portions 2d of the second component 2. At this time, the ultrasonic horn 10 is brought into contact from a direction that is substantially perpendicular relative to the contact surface 2a so that the ultrasonic horn 10 does not cause the position of the second component 2 to change. Next, as shown in FIG. 4, while ultrasonic waves are being generated from the ultrasonic horn 10, the protruding portion 2d is pressed by the ultrasonic horn 10 towards the through hole 1b which is positioned on the same axis as the protruding portion 2d. Here, it is preferable that the shape of a contact end surface 10a of the ultrasonic horn 10 is the same as the shape of the surface 2b which is where the protruding portions 2d are formed and which is on the opposite side from the contact surface 2a. For example, in the present embodiment, it is preferable that the shape of the end surface 10a is a substantially flat surface.

Figure 5:
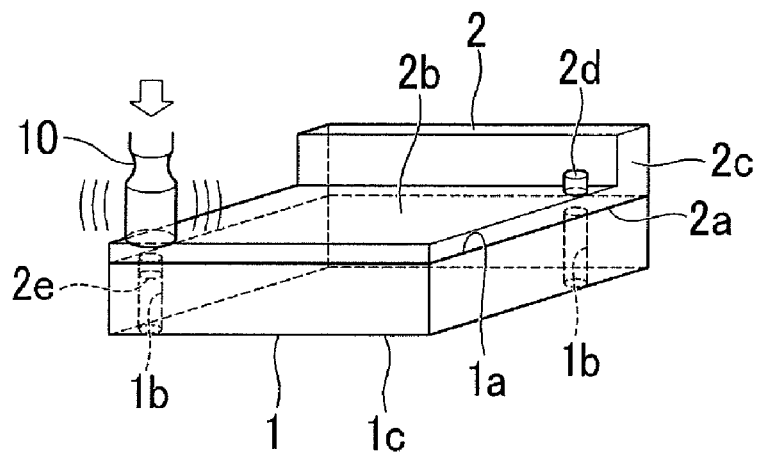
FIG. 5 is an explanatory view illustrating the second step in the fixing method of the first embodiment of the present invention.
Figure 6:
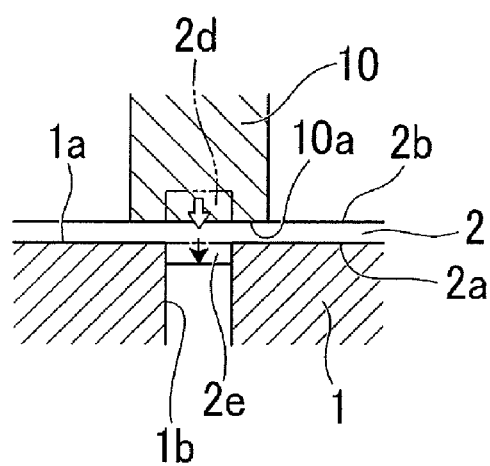
FIG. 6 is an explanatory view illustrating the second step in the fixing method of the first embodiment of the present invention.

The ultrasonic waves transmitted from the ultrasonic horn 10 to the protruding portion 2d are transmitted to the first component 1 via the second component 2, and frictional heat is generated in the second component 2. Here, the second component 2 is formed from a thermoplastic resin, and the first component 1 has the through holes 1b in positions facing the ultrasonic horn 10. As a result of this, as shown in FIG. 5 and FIG. 6, the second component 2 is heat-softened by the frictional heat generated by the transmitted ultrasonic waves, and is deformed by the pressing force from the ultrasonic horn 10 so as to protrude as the engaging portion 2e inside the facing through hole 1b. Here, the protruding portion 2d that the ultrasonic horn 10 is pressing against sinks into the surface 2b which is located on the opposite side from the contact surface 2a, and the engaging portion 2e is made to protrude from the contact surface 2a for substantially the same volumetric amount as that of the protruding portion 2d. Next, as is shown in FIG. 6, when the end surface 10a of the ultrasonic horn 10 contacts the surface 2b of the second component 2 which is located on the opposite side from the contact surface 2a, the ultrasonic wave oscillation and the pressing are stopped. The engaging portion 2e which has been formed by this heat-softening is then cooled and hardened, so that the engaging portion 2e and the through hole 1b which is the portion being engaged are reliably engaged together.

Figure 7:
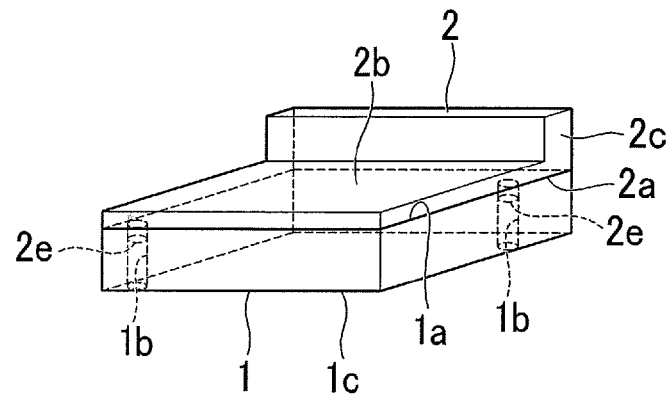
FIG. 7 is a perspective view showing the first component and the second component that have been fixed using the fixing method of the first embodiment of the present invention.

Next, in the same way, the other protruding portion 2d is pressed by the ultrasonic horn 10 while ultrasonic waves are transmitted thereto so as to form an engaging portion 2e, and this engaging portion 2e is then engaged in the corresponding through hole 1b. As a result of this, as shown in FIG. 7, the first component 1 and the second component 2 are set in position and fixed together on their respective contact surfaces 1a and 2a by the two sets of engaging portions 2e and through holes 1b which function as engaged portions.

As is described above, according to the fixing method of the present embodiment, a second component 2 is used which has protruding portions 2d on the surface 2b which is located on the opposite side from the contact surface 2a which is in contact with the first component 1 which is made of a thermoplastic resin. Because of this, when the above described first step and second step are being performed, the first component 1 and the second component 2 can be set in position easily and accurately, and fixed together without either one becoming damaged. In particular, according to the fixing method of the present embodiment, an ultrasonic horn 10 is used whose end surface 10a is the same substantially flat surface as the surface 2b of the second component 2 which is on the opposite side from the contact surface 2a. Because of this, the end surface 10a presses the protruding portions 2d until it contacts the surface 2b, so that the protruding portions 2d are prevented from protruding above the surface 2b of the second component 2 after the fixing operation has ended. Namely, the external appearance of the second component 2 after the fixing operation can be made even more attractive.

Note that, in the present embodiment, the inner diameter of the through holes 1b is set so as to be substantially the same as the outer diameter of the protruding portions 2d. However, the present invention is not limited to this, and it is also possible for the inner diameter of the through holes 1b to be larger than the outer diameter of the protruding portions 2d. In this case, when the first component 1 and the second component 2 have been set in position and fixed together, the first component 1 and the second component 2 are able to move slightly relatively to each other over their respective contact surfaces. However, it is possible to use the through holes 1b which has a larger internal diameter than the outer diameter of the protruding portions 2d for temporary fixing, and to then more firmly fix together the first component 1 and the second component 2 by screws or rivets while the relative positions of the first component 1 and the second component 2 are maintained. In contrast, in the present embodiment, because the engaging portions 2e that are engaged in the through holes 1b become fused to the wall surfaces of the through holes 1b as a result of cooling and hardening, this fusing provides resistance against a certain amount of pulling out force. Because of this, the first component 1 and the second component 2 can also be fixed together using only the fixing provided by the fusing of the engaging portions 2e to the wall surfaces of the through holes 1b.

Moreover, in the above described embodiment, the portions being engaged were the through holes 1b. However, the present invention is not limited to this. It is sufficient if at least the engaging portions 2e that protrude from the contact surface 2a of the second component 2 are able to be engaged. Namely, it is sufficient if recessed portions or the like which are formed in the contact surface 1a are recessed deeper in the direction of the surface 1c on the opposite side from the contact surface 1a than the height to which the engaging portions 2e protrude. Moreover, the cross-sectional configuration of the portions being engaged does not have to be circular and may also be rectangular. In this case, it is preferable for the protruding portions 2d to also have a corresponding substantially rectangular cross-section. Moreover, it is not necessary to press the protruding portions 2d until they are completely buried and do not protrude from the surface 2b on the opposite side from the contact surface 2a. If the protruding portions 2d may protrude from the surface 2b after the fixing, then it is also possible for a fixed amount of the protruding portions 2d, which serve as the engaging portions 2e, to be protruded from the contact surface 2a and engaged in the through holes 1b, which serve as the portions being engaged. And the pressing of the protruding portions 2d by the ultrasonic horn 10 may be halted while the protruding portions 2d still remain above the surface 2b.

Furthermore, in the above described embodiment, the first component 1 and the second component 2 are substantially plate-shaped, and the respective contact surfaces 1a and 2a, as well as the surfaces 1c and 2b on the opposite side thereof are formed as substantially flat surfaces. However, the present invention is not limited to this. For example, the first component 1 and the second component 2 may also have concave or convex curved surfaces. In this case, because the end surface 10a of the ultrasonic horn 10 is formed as a curved surface corresponding to the shape of the first component 1 and the second component 2, it is possible to obtain a smooth external surface after the protruding portions 2d have been buried in the second step.

Second Embodiment

Next, a second embodiment of the present invention will be described. FIGS. 8 through 15 show a second embodiment of the present invention. In this embodiment, the same symbols are used for the same components as those used in the above described embodiment, and any description thereof is omitted.

Figure 8:
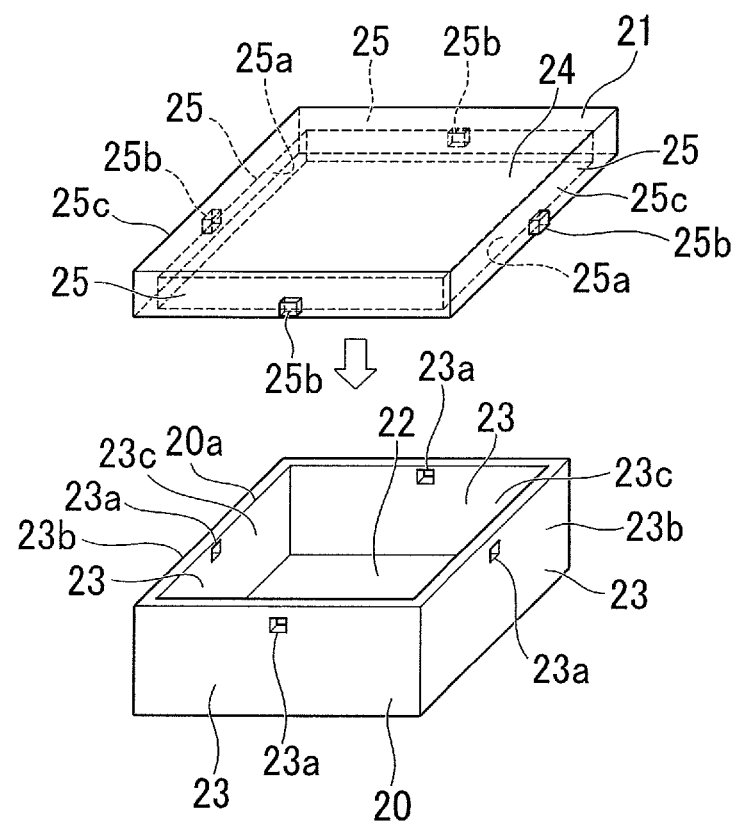
FIG. 8 is a perspective view showing a box body and a lid body before fixing in a fixing method of a second embodiment of the present invention.

FIG. 8 shows a box body 20, which serves as the first component, and a lid body 21, which serves as the second component, that are set in position and fixed together using the fixing method of the present embodiment. The box body 20 is formed by a substantially rectangular bottom plate 22, and by four side plates 23 that stand upright from the bottom plate 22 and extend around the circumference thereof. The box body 20 has an aperture portion 20a in a top portion thereof. Through holes 23a which serve as portions being engaged and which have a substantially rectangular cross-sectional configuration are formed substantially in the center of a top portion of each side plate 23 so as to penetrate from an outer surface 23b, which serves as a contact surface, to an inner surface 23c. The material used to form the box body 20 can be selected from the same various materials as those of the first embodiment.

The lid body 21 is formed from a thermoplastic resin and has a substantially plate-shaped lid main body 24 that covers the aperture portion 20a of the box body 20, and four edge plates 25 that extend around the circumference of the lid main body 24. The space between inner surfaces 25a, which serve as contact surfaces, of mutually facing edge plates 25 is set so as to be substantially equal to the space between outer surfaces 23b, which form contact surfaces, of the corresponding side plates 23 of the box body 20. Accordingly, the lid body 21 can be fitted with the minimum required clearance onto the top portion of the box body 20 so as to close off the aperture portion 20a. Moreover, substantially square column-shaped protruding portions 25b are formed substantially in the center of each edge plate 25 such that they protrude from the external surfaces 25c. Each protruding portion 25b corresponds respectively to the positions of the respective through holes 23a in the box body 20. The protruding portions 25 are positioned such that, when the lid body 21 has been placed on top of the boxy body 20, they are coaxial with an axis that passes through the corresponding through hole 23a.

Next, the fixing method used to fix the box body 20 and the lid body 21 together will be described in detail.

Figure 9:
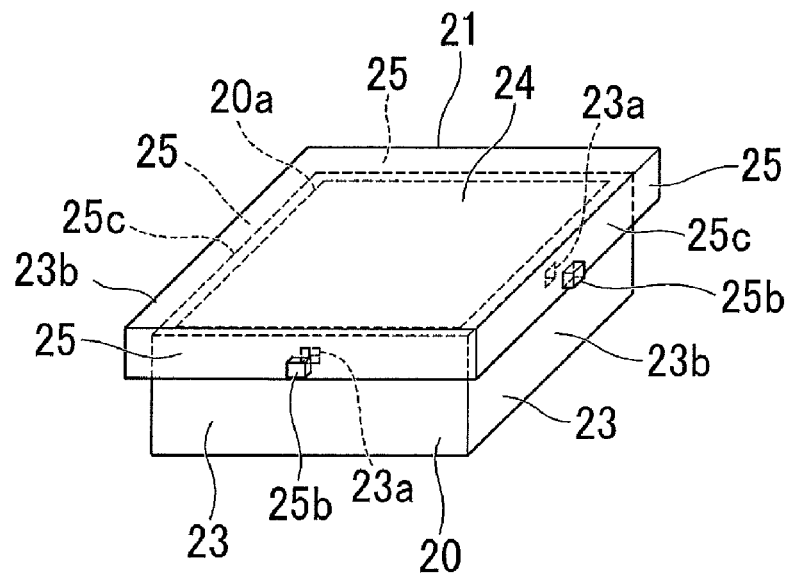
FIG. 9 is an explanatory view illustrating a first step in the fixing method of the second embodiment of the present invention.
Figure 10:
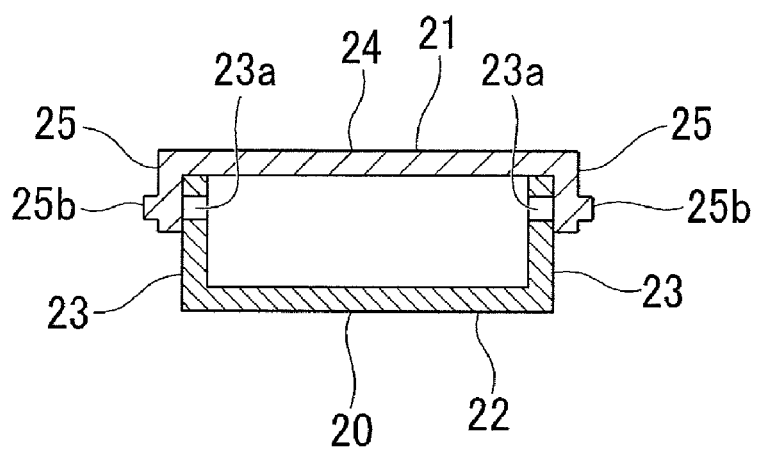
FIG. 10 is an explanatory view illustrating the first step in the fixing method of the second embodiment of the present invention.

In a first step, as shown in FIGS. 9 and 10, the lid body 21 is fitted onto a top portion of the box body 20 so as to close off the aperture portion 20a. In this state, the inner surfaces 25a of the edge plates 25 which form the contact surfaces of the lid body 21 are in contact with outer surfaces 23b which form the contact surfaces of the box body 20. Furthermore, the respective protruding portions 25b of the lid body 21 are positioned so as to be coaxial with the axes passing through each one of the through holes 23a of the box body 20.

Figure 11:
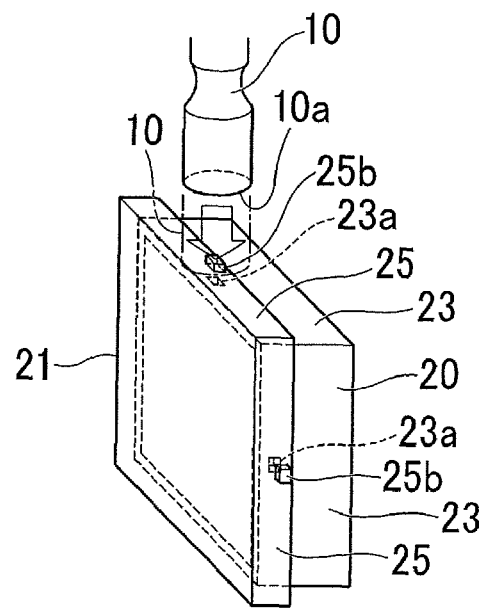
FIG. 11 is an explanatory view illustrating a second step in the fixing method of the second embodiment of the present invention.
Figure 12:
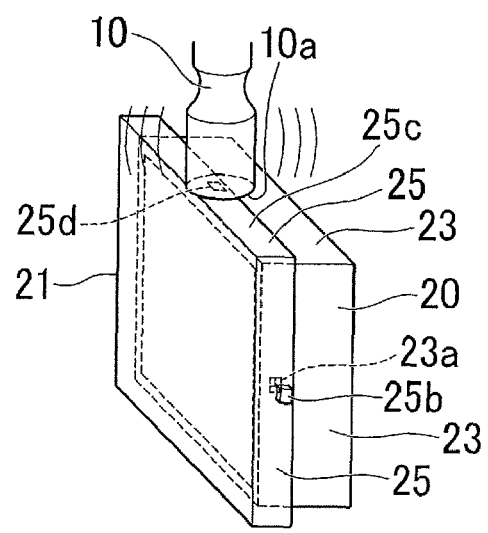
FIG. 12 is an explanatory view illustrating the second step in the fixing method of the second embodiment of the present invention.
Figure 13:
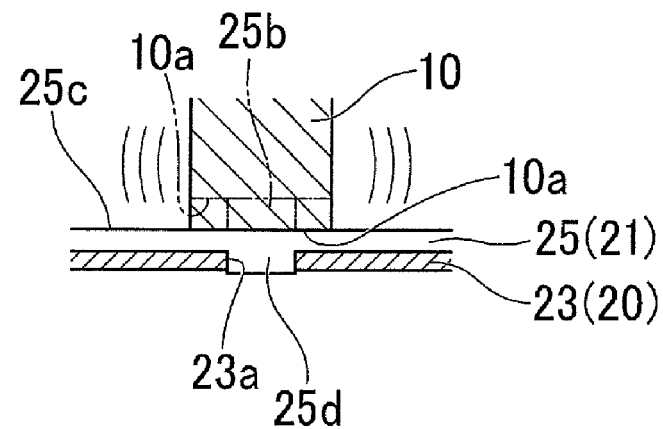
FIG. 13 is an explanatory view illustrating the second step in the fixing method of the second embodiment of the present invention.
Figure 14:
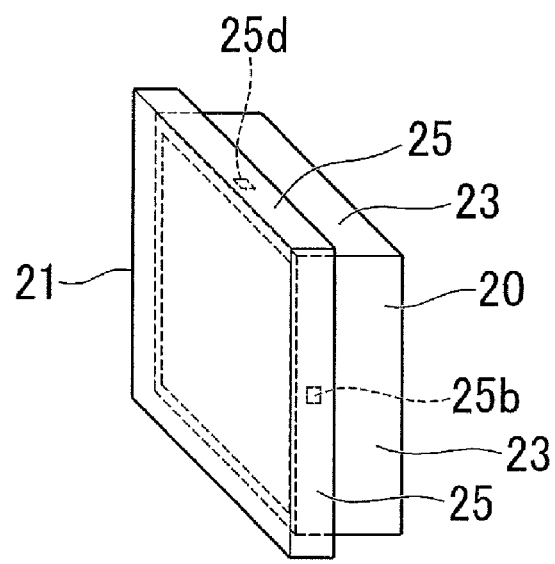
FIG. 14 is a perspective view showing a box body and a lid body that have been fixed using the fixing method of a second embodiment of the present invention.
Figure 15:
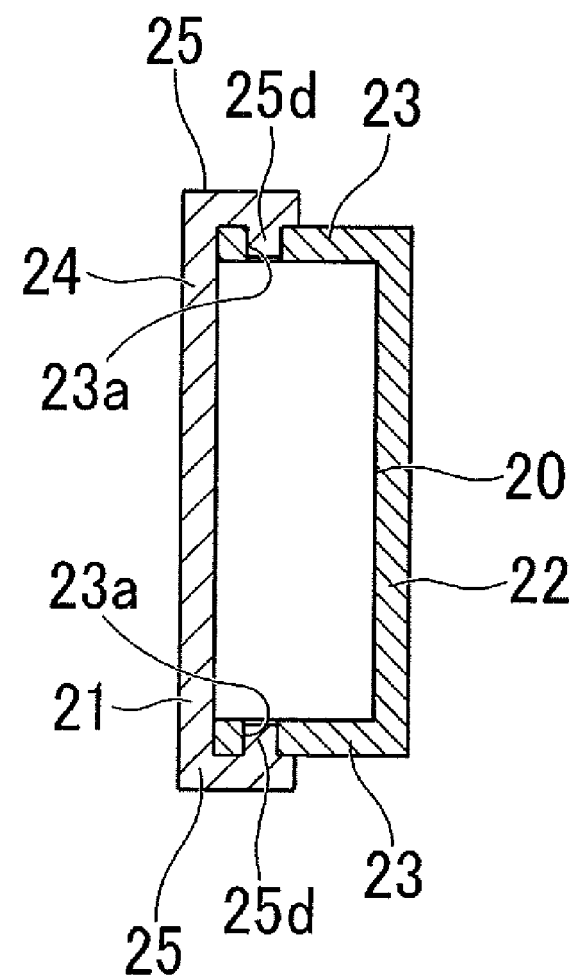
FIG. 15 is a cross-sectional view showing a box body and a lid body that have been fixed using the fixing method of a second embodiment of the present invention.

In a second step, as shown in FIG. 11, anyone of the side plates 23 of the box body 20 and of the edge plates 25 of the lid body 21 are positioned facing upwards (i.e., such that an axis which is parallel with the inner wall of the through hole 23a thereof extends in a vertical direction), and the ultrasonic horn 10 is moved downwards in the vertical direction so as to be placed against the protruding portion 25b which is formed on this upwardly facing edge plate 25 of the lid body 21. By then pressing the protruding portion 25b with the ultrasonic horn 10 while transmitting ultrasonic waves to the protruding portion 25b, the edge plate 25 of the lid body 21 is heat-softened, and the inner surface 25a is made to protrude as an engaging portion 25d. Next, as shown in FIG. 12 and FIG. 13, the protruding portion 25b is pressed by the ultrasonic horn 10 until the protruding portion 25b is completely buried in the external surface 25c of the edge plate 25 and the end surface 10a comes up against the external surface 25c. The ultrasonic wave oscillation and the pressing are stopped at this point, and the heat-softened resin is allowed to cool and harden so that the engaging portion 25d is engaged in the through hole 23a which serves as the portion being engaged. Next, as shown in FIG. 14 and FIG. 15, the above second step is repeated for all of the protruding portions 25b by changing the orientation of the box body 20 and lid body 21 until all of the engaging portions 25d are engaged in the through holes 23a serving as portions being engaged. As a result of this, the lid body 21 becomes firmly fixed to the box body 20. As described above, when the box body 20 is used as the first component and the lid body 21 is used as the second component, by employing the present fixing method, the lid body 21 can be fixed to the box body 20 while the aperture portion 20a of the box body 20 remains closed off by the lid body 21.

Embodiments of the present invention have been described in detail above with reference made to the drawings. However, the specific structure of the present invention is not limited to these embodiments. Various design modifications and the like may be made without departing from the scope of the present invention.

According to the fixing method for fixing components together of the present invention, a second component is used which is formed from a thermoplastic resin and which has protruding portions on a surface thereof on the opposite side from the contact surface which is in contact with the first component. Because of this, when the above described first step (i.e., the matching together of the positions of the first component and second component) and second step (i.e., the engaging together of the first component and second component) are performed, the first component and the second component can be set in position easily and accurately, and fixed together without either one becoming damaged.

What is claimed is:

1. A fixing method for fixing components together in which two components in the form of a first component and a second component are positioned such that they are mutually superimposed in predetermined relative positions, and are then fixed together, wherein the first component has at least two portions for engagement that are recessed in a contact surface thereof which is placed against the second component towards a surface thereof, and the second component is made of a thermoplastic resin and has at least two protruding portions that protrude from positions that correspond to the portions for engagement of the first component on a surface of the second component which is located on the opposite side from the contact surface thereof which is placed against the first component, and wherein the fixing method for fixing components together is provided with:

a first step in which the contact surfaces of both the first component and the second component are placed against each other, and the positions of the portions for engagement and the protruding portions are matched together; and a second step in which, by pressing a transmitting component that transmits ultrasonic waves on the protruding portions of the second component, the second component is softened by the ultrasonic waves and forms engaging portions that are made to protrude into the portions for engagement of the first component and become engaged with these portions for engagement.

2. The fixing method for fixing components together according to claim 1, wherein, in the second step, at the same time as the transmitting component transmits ultrasonic waves, the transmitting component continues to press the protruding portions until the transmitting component contacts the surface of the second component which is located on the opposite side from the contact surface thereof.

* * * * *